(12) United States Patent
Abdel-Kader (10) Patent No.: US 7,792,554 B2
(45) Date of Patent: *Sep. 7, 2010

(54) METHODS AND APPARATUS FOR REDUCING POWER CONSUMPTION DURING NETWORK SCANNING OPERATIONS WITH ADVERSE BATTERY CONDITIONS

(75) Inventor: Sherif Abdel-Kader, Waterloo (CA)

(73) Assignee: Research In Motion Limited, Warterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/333,551

(22) Filed: Dec. 12, 2008

(65) Prior Publication Data

US 2009/0098916 A1 Apr. 16, 2009

Related U.S. Application Data

(63) Continuation of application No. 11/227,876, filed on Sep. 15, 2005, now Pat. No. 7,480,521.

(51) Int. Cl.
*H04B 1/38* (2006.01)
*H04B 7/00* (2006.01)
*H04M 1/00* (2006.01)

(52) U.S. Cl. .................. 455/574; 455/572; 455/41.2
(58) Field of Classification Search ............... 455/515, 455/68, 572, 574, 41.2, 67.11, 127.1, 343.1, 455/343.5
See application file for complete search history.

(56) References Cited

U.S. PATENT DOCUMENTS

| | | | |
|---|---|---|---|
| 5,627,882 A | 5/1997 | Chien et al. | |
| 5,799,256 A | 8/1998 | Pombo et al. | |
| 6,804,542 B1 | 10/2004 | Haartsen | |
| 7,146,151 B2 | 12/2006 | Arimitsu | |
| 7,480,521 B2 * | 1/2009 | Abdel-Kader | ............... 455/574 |
| 2002/0082010 A1 | 6/2002 | Koorapaty et al. | |
| 2003/0008675 A1 | 1/2003 | Willats et al. | |
| 2003/0036354 A1 | 2/2003 | Lee et al. | |
| 2004/0142713 A1 | 7/2004 | Harris et al. | |
| 2004/0259542 A1 | 12/2004 | Viitamaki et al. | |
| 2005/0096053 A1 | 5/2005 | Liu et al. | |
| 2006/0014537 A1 | 1/2006 | Arai et al. | |
| 2006/0046653 A1 | 3/2006 | Kirbas et al. | |
| 2006/0128308 A1 | 6/2006 | Michael et al. | |
| 2006/0199538 A1 | 9/2006 | Eisenbach | |
| 2007/0207841 A1 | 9/2007 | Amerga et al. | |

\* cited by examiner

*Primary Examiner*—Andrew Wendell
(74) *Attorney, Agent, or Firm*—John J. Oskorep, Esq.

(57) ABSTRACT

In a mobile communication device, a scanning operation is performed with use of a wireless transceiver to identify one or more available wireless communication networks in a given coverage area. Each time the scanning operation fails to result in any connection between the mobile device and a wireless network, the scanning operation is repeated after delaying for a next delay period of a plurality of scanning delay periods $n=[n_1, n_2, \ldots,$ upper limit]. Initially, an upper limit of the plurality of scanning delay periods $n=[n_1, n_2, \ldots,$ upper limit] is established at a value of M. During operation, the mobile device monitors to identify whether a predetermined battery condition, such as a low battery capacity or high battery discharge rate, exists. If the predetermined battery condition exists, the upper limit of the plurality of scanning delay periods $n=[n_1, n_2, \ldots,$ upper limit] is reestablished at a value of $N>M$. If a more severe battery condition exists, the upper limit of the plurality of scanning delay periods $n=[n_1, n_2, \ldots,$ upper limit] is reestablished at a value of $P>N>M$. Advantageously, power consumption is reduced during adverse battery conditions of the mobile device.

20 Claims, 5 Drawing Sheets

METHODS AND APPARATUS FOR REDUCING POWER CONSUMPTION DURING NETWORK SCANNING OPERATIONS WITH ADVERSE BATTERY CONDITIONS

CROSS-REFERENCE TO RELATED APPLICATIONS

This application is a continuation of and claims priority to a U.S. non-provisional patent application entitled "Methods And Apparatus For Reducing Power Consumption During Network Scanning Operations With Adverse Battery Conditions" having application Ser. No. 11/227,876 and filing date of 15 Sep. 2005, now U.S. Pat. No. 7,480,521 B2, which is hereby incorporated by referenced herein.

BACKGROUND

1. Field of the Technology

The present application relates generally to wireless communication devices which communicate with wireless communication networks such as wireless local area networks (WLANs), and more particularly to network scanning operations when adverse battery conditions are present for such wireless communication devices.

2. Description of the Related Art

A mobile communication device, such as a portable battery-powered wireless communication device, is operative to communicate in wireless communication networks. For example, the mobile device may communicate through wireless access points (APs) of wireless local area networks (WLANs) which operate in accordance with 802.11 standards or the like. When the mobile device is powered-on, or radio frequency (RF) coverage is regained after a coverage loss, the mobile device performs a scanning operation with use of its wireless transceiver to identify one or more available wireless networks in its coverage area. During each scanning operation, the mobile device transmits a probe request to each network identified in one or more network profiles stored in the mobile device, and waits for a probe response from the network in return.

Each time the scanning operation fails to result in any connection between the mobile device and a wireless network, the scanning operation is repeated by the mobile device after delaying for a next delay period selected from a plurality of scanning delay periods n=[$n_1$, $n_2$, ..., upper limit] of the mobile device. During the scanning delay period, the mobile device is placed into a power conservation mode to reduce consumption of the device's battery. The plurality of scanning delay periods n=[$n_1$, $n_2$, ..., upper limit] are typically consecutively-increasing delay periods up until the upper limit. One example of a plurality of scanning delay periods is n=[1, 2, 4, 8, 15, 30, and 60 seconds]. This process continually repeats until the mobile device connects with one of the wireless networks, if at all.

Although traditional techniques reduce the power consumption of the mobile device, there is a need for further reducing the power consumption during network scanning operations, especially during adverse battery conditions of the mobile device.

BRIEF DESCRIPTION OF THE DRAWINGS

Embodiments of the present application will now be described, by way of example only, with reference to the attached figures. Same reference numerals are used in different figures to denote similar elements.

DETAILED DESCRIPTION OF THE PREFERRED EMBODIMENTS

In a mobile communication device, a scanning operation is performed with use of a wireless transceiver to identify one or more available wireless communication networks in a given coverage area. Each time the scanning operation fails to result in any connection between the mobile device and a wireless network, the scanning operation is repeated after delaying for a next delay period of a plurality of scanning delay periods n=[$n_1$, $n_2$, ..., upper limit]. Initially, an upper limit of the plurality of scanning delay periods n=[$n_1$, $n_2$, ..., upper limit] is established at a value of M. During operation, however, the mobile device monitors to identify whether a predetermined battery condition, such as a low battery capacity or high battery discharge rate, exists. If the predetermined battery condition exists, the upper limit of the plurality of scanning delay periods n=[$n_1$, $n_2$, ..., upper limit] is reestablished at a value of N>M. If a more severe battery condition exists, the upper limit of the plurality of scanning delay periods n=[$n_1$, $n_2$, ..., upper limit] is reestablished at a value of P>N>M. Advantageously, power consumption is reduced during adverse battery conditions of the mobile device.

Figure 1:
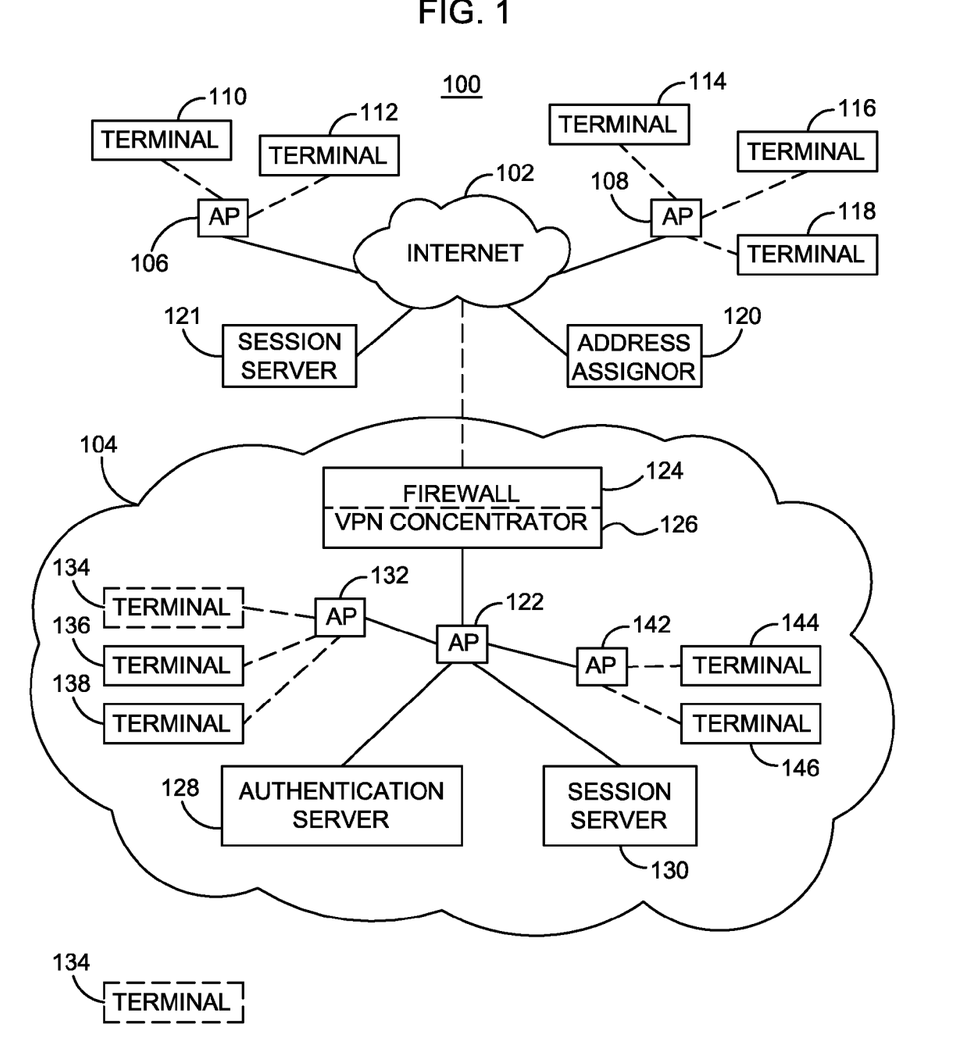
FIG. 1 is a block diagram which illustrates a communication system which includes a plurality of mobile communication devices and one or more wireless communication networks (e.g. WLANs)

FIG. 1 is a block diagram which illustrates a communication system 100 which includes a plurality of communication devices or terminals which communication in one or more communication networks 102, 104. The terminals may connect to their associated networks through, for example, one or more access points (APs) as indicated in the figure. Preferably, at least some of the APs are wireless APs and at least some of the terminals are mobile/wireless communication devices which interface and connect through these wireless APs. A wireless AP may be part of a wireless local area network (WLAN). If so, the terminals and APs may operate in accordance with well-known IEEE 802.11 or other suitable standards. WLANs may be located in any suitable area or environment, and are typically found in coffee shops, restaurants, hotels, airports, and company offices. Areas within which WLANs provide coverage may be referred to as "hot spots". Terminals may communicate wirelessly within and through a WLAN over radio frequency (RF) communication links.

In the present embodiment, communication network 104 is part of a private network that is connected to communication network 102 which is a public network. In the following description, communication network 104 may also be referred to private network 104 and communication network 102 may also be referred to as public network 102. In this example, public network 102 is or includes the Internet. WLANs may be wire-connected to the Internet using traditional Telco connections to provide higher bandwidth data communications for connected terminals. The terminals shown in public network 102 of FIG. 1 include terminals 110 and 112 which interface with AP 106, and terminals 114, 116, and 118 which interface with AP 108. The terminals shown in private network 104 of FIG. 1 include terminals 134, 136, 138 which interface with AP 132, and terminals 144 and 146 which interface with AP 142.

If terminal 110 is on public network 102 such as the Internet, it may be assigned with a dynamically-assigned public IP address which is utilized for communications. This assignment is typically performed by an address assignor 120 which may be a Dynamic Host Control Protocol (DHCP) server. Alternatively, the IP address may be a static IP address which is assigned to terminal 110. The terminals in public network 102 may also have the ability to request a virtual private network (VPN) connection to private network 104 for communications. Terminal 110 on the Internet 102 may gain access to private network 104 using VPN techniques, where a secure VPN tunnel connection between terminal 110 and private network 104 is established along with an assignment of a private IP address. The VPN negotiation may require authentication through an authentication server 128 (e.g. RADIUS server) in private network 104. The authentication may involve a typical logon procedure which includes verification of a username and password which are keyed in at terminal 110. Alternatively, terminal 110 may have authentication information prestored in memory which is automatically provided to authentication server 128 in private network 104.

Communication system 100 may also include one or more servers to facilitate communications for the terminals. For example, communication system 100 may include at least one communication session server, which may be a session initiation protocol (SIP) server. In the embodiment shown, communication system 100 has a session server 121 in public network 102 and a session server 130 in private network 104. Note that some communication applications utilized by terminals, such as Voice over Internet Protocol (VoIP) applications, require the use of SIP. SIP is well-documented in standard documents such as Request For Comments (RFC) 3261.

Figure 2:
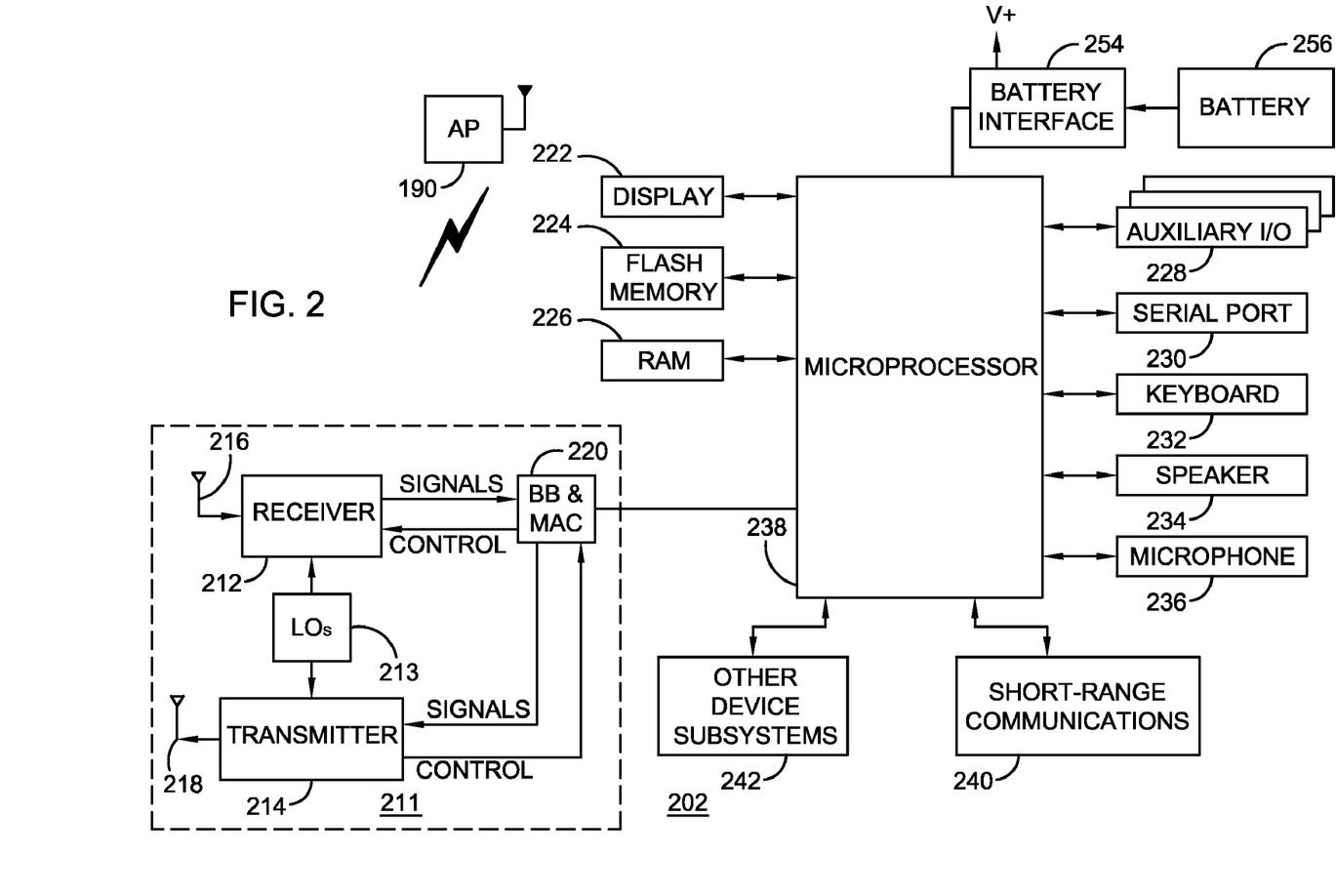
FIG. 2 is a more detailed schematic diagram of the mobile communication devices of FIG. 1, namely, a mobile station of the preferred embodiment.

Referring now to FIG. 2, electrical components of a typical mobile station (MS) 202 (one type of mobile communication device) which operates with wireless APs of communication system 100 of FIG. 1 will be described. Mobile station 202 is preferably a two-way communication device having at least voice and advanced data communication capabilities, including the capability to communicate with other computer systems. Also preferably, mobile station 202 is a wireless communication device which operates in accordance with an IEEE 802.11 standards. Depending on the functionality provided by mobile station 202, it may be referred to as a data messaging device, a two-way pager, a cellular telephone with data messaging capabilities, a wireless Internet appliance, or a data communication device (with or without telephony capabilities).

As shown in FIG. 2, mobile station 202 is adapted to wirelessly communicate with AP 190 which may be a wireless AP of the present application. For communication with AP 190, mobile station 202 utilizes communication subsystem 211. Depending on the type of device, mobile station 202 may also be adapted to wirelessly communicate with other systems such as cellular telecommunication systems. With such configuration, mobile station 202 may be referred to as a "dual mode" mobile station. Although mobile station 202 may have separate and independent subsystems for these purposes, at least some portions or components of these otherwise different subsystems may be shared where possible.

Communication subsystem 211 includes a receiver 212, a transmitter 214, and associated components, such as one or more (preferably embedded or internal) antenna elements 216 and 218, local oscillators (LOs) 213, and a processing module such as a baseband (BB) and media access control (MAC) processing module 220. As will be apparent to those skilled in the field of communications, the particular design of communication subsystem 211 depends on the communication network in which mobile station 202 is intended to operate. In the present application, communication subsystem 211 (including its associated processor/processing components) are operative in accordance with IEEE 802.11 standards.

Mobile station 202 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in BB/MAC processing module 220. In a similar manner, signals to be transmitted are processed, including modulation and encoding, for example, by BB/MAC processing module 220. These processed signals are input to transmitter 214 for digital-to-analog (D/A) conversion, frequency up conversion, filtering, amplification and transmission through the network via antenna 218. BB/MAC processing module 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Since mobile station 202 is a portable battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. Battery interface 254 is coupled to a regulator (not shown in FIG. 2) that provides power V+ to all of the circuitry.

Mobile station 202 includes a microprocessor 238 (one type of processor or controller) that controls overall operation of mobile station 202. This control includes the scanning and other operational techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications that control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores may also be available on mobile station 202 to facilitate storage of PIM data items and other information.

The PIM application preferably has the ability to send and receive data items via the wireless network. In a preferred embodiment, PIM data items are seamlessly integrated, synchronized, and updated via the wireless network, with the wireless device user's corresponding data items stored and/or associated with a host computer system thereby creating a mirrored host computer on mobile station 202 with respect to such items. This is especially advantageous where the host computer system is the wireless device user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication. Short-range communications subsystem 240 of FIG. 2 is an additional optional component that provides for communication between mobile station 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Although a specific mobile station 202 has just been described, any suitable mobile communication device or terminal may be part of the inventive methods and apparatus which will be described in fuller detail below. Note that many components of mobile station 202 shown and described may not be included (e.g. a full QWERTY keypad may be optional).

When a mobile device (e.g. mobile station 202 of FIG. 2) is powered-on, or radio frequency (RF) coverage of the mobile device is regained after a coverage loss, the mobile device performs a scanning operation with use of its wireless transceiver to identify one or more available wireless networks in its coverage area. For example, during each scanning operation, the mobile device may transmit a probe request to each network identified in one or more network profiles stored in the mobile device. The mobile device waits for a probe response from the network in return. Each time the scanning operation fails to result in any connection between the mobile device and a wireless network, the scanning operation is repeated by the mobile device after delaying for a next delay period selected from of a plurality of scanning delay periods $n=[n_1, n_2, \ldots, \text{upper limit}]$. During the scanning delay period, the mobile device is placed into a power conservation mode to reduce consumption of the device's battery. The scanning and delaying process continually repeats until the mobile device connects with one of the wireless networks.

The scanning delay periods of $n=[n_1, n_2, \ldots, \text{upper limit}]$ are typically consecutively-increasing delay periods having an upper limit. Assuming no network connection occurs from several network scanning operations, the upper limit is used repeatedly once it is reached. Initially, the upper limit of the plurality of scanning delay periods $n=[n_1, n_2, \ldots, \text{upper limit}]$ is established at a value of M. One example of a plurality of consecutively-increasing scanning delay periods is $n=[1, 2, 4, 8, 15, 30, 60, \text{and } 120 \text{ seconds}]$ where the upper limit of M is 120 seconds.

According to the present application, the mobile device monitors to identify whether a predetermined battery condition, such as a low battery capacity condition or a high battery discharge rate, exists. If the predetermined battery condition exists, then the upper limit of the plurality of scanning delay periods $n=[n_1, n_2, \ldots, \text{upper limit}]$ is established at a value of $N>M$. For example, the upper limit of N may be 240 seconds so that $n=[1, 2, 4, 8, 15, 30, 60, 120, \text{and } 240 \text{ seconds}]$. Further, if another predetermined battery condition more severe than the predetermined battery condition exists, such as a lower battery capacity condition or a higher battery discharge rate, then the upper limit of the plurality of scanning delay periods $n=[n_1, n_2, \ldots, \text{upper limit}]$ is established at a value of $P>N>M$. For example, the upper limit of P may be 480 seconds so that $n=[1, 2, 4, 8, 15, 30, 60, 120, 240, \text{and } 480 \text{ seconds}]$. Advantageously, power consumption is reduced during adverse battery conditions of the mobile device.

Figure 3:
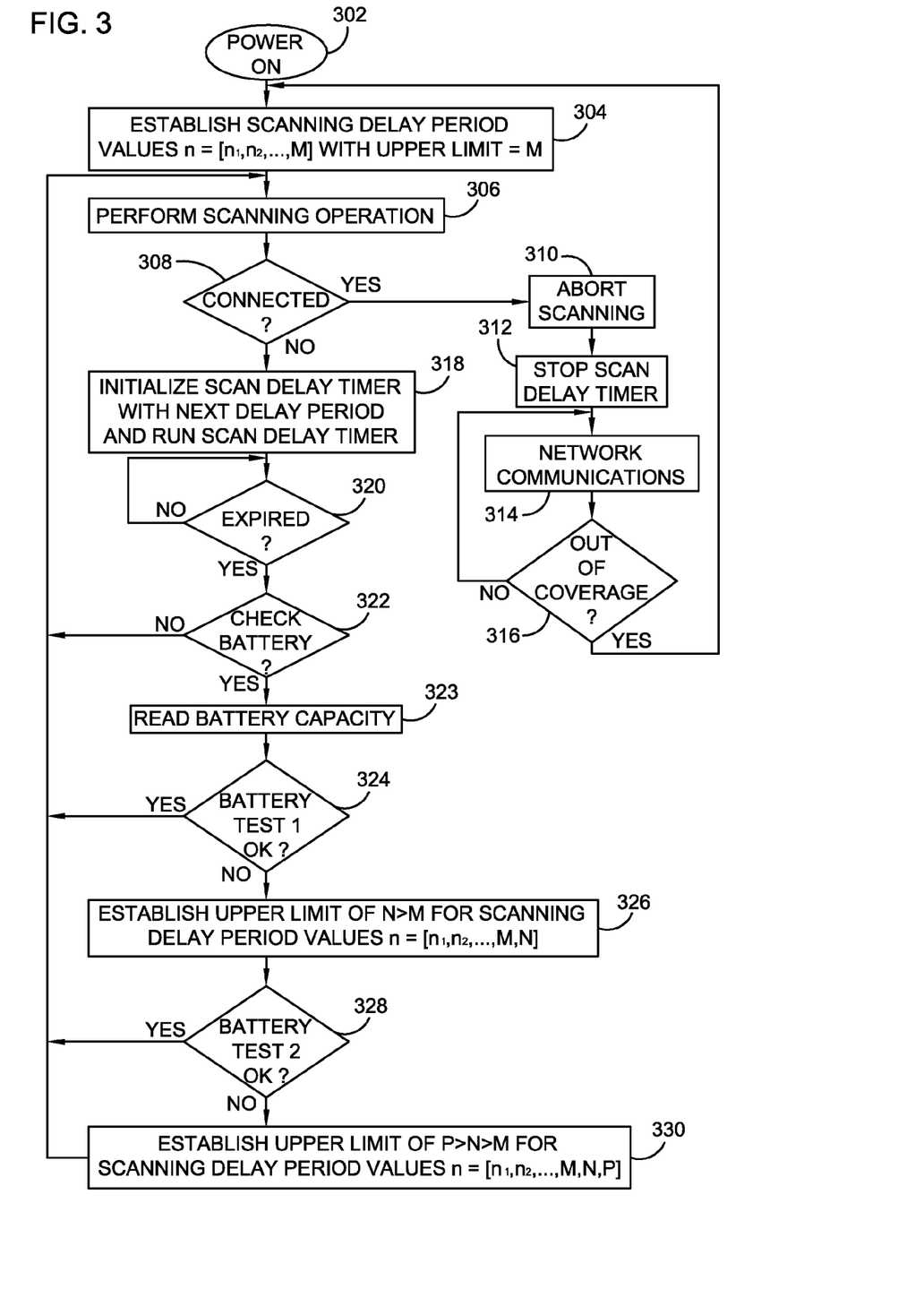
FIG. 3 is a flowchart which helps describe a method for use in scanning for reducing power consumption of a mobile communication device.

FIG. 3 is a flowchart which describes a detailed method for use in scanning for reducing power consumption of a mobile communication device, such as a mobile station of FIG. 2. A mobile communication device which performs the method may include includes one or more processors, a wireless transceiver coupled to the one or more processors, and a battery interface which is adapted to receive one or more batteries which supply electrical power to the mobile communication device. The one or more processors of the mobile device are used to execute the method with use of the wireless transceiver.

Figure 4:
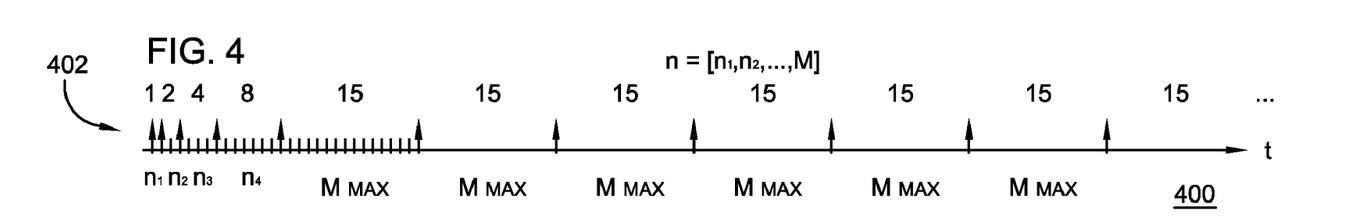
FIGS. 4-6 are timelines which show a plurality of scanning operations which are performed by the mobile communication device using variable scanning delay periods which are based on predetermined battery conditions of the mobile communication device.

Initially, the mobile device is powered on by an end user (initial block 302 of FIG. 3) where traditional initialization procedures are performed. During initialization, the mobile device establishes a plurality of scanning delay period values of n=[$n_1$, $n_2$, . . . , upper limit] (step 304 of FIG. 3) for subsequent scanning procedures. The scanning delay periods of n=[$n_1$, $n_2$, . . . , upper limit] are typically consecutively-increasing delay periods having an upper limit. Initially, the upper limit of the plurality of scanning delay periods n=[$n_1$, $n_2$, . . . , upper limit] is established at a value M. An illustrative example of a first plurality of consecutively-increasing scanning delay periods 402 is shown in a graph 400 of FIG. 4 where n=[1, 2, 4, 8, and 15 seconds] and the upper limit of M is 15 seconds. Each upwards-pointing arrow is indicative of a scanning operation performed by the mobile device. As shown, assuming no network connection occurs from several network scanning operations, the upper limit of M is preferably used repeatedly once it is reached.

Referring back to FIG. 3, after initialization where step 304 is performed, the mobile device automatically attempts to find a preferred wireless network to connect with for communications. To do this, the mobile device performs a scanning operation (step 306 of FIG. 3). The mobile device has one or more network profiles stored in its memory which identify preferred networks for communications. Each network profile includes at least a wireless network name and a wireless network identification, such as a Service Set Identifier (SSID). The mobile device causes a scanning operation to be performed with use of this information in order to connect with one of the preferred wireless networks, in order of priority.

During scanning, the mobile device may transmit a probe request to each network identified in one or more network profiles stored in the mobile device. Here, the mobile device waits for a probe response from the network in return, If no probe response is received by the mobile device, it is understood that the mobile device is not within the coverage area of the wireless network or is otherwise out-of-coverage. If this occurs, no connection will be made with that particular network. If the probe response is received, however, the mobile device may connect with the network for communications.

The mobile devices identifies whether any connection has been made to any of the networks (step 308 of FIG. 3). If the mobile device has connected to any of the networks as identified in step 308, the mobile device aborts the scanning operation (step 310 of FIG. 3) and stops the running of the scan delay timer (step 312 of FIG. 3). Communications between the mobile device and the network may then take place (step 314 of FIG. 3). Such communications will continue until the mobile device loses coverage with the network as identified in step 316 of FIG. 3, where the mobile device will repeat the steps beginning at step 304 of FIG. 3.

If no connection with any network is made after the scanning operation as identified in step 308 of FIG. 3, the mobile device selects a (next) delay period from the plurality of scanning delay periods n=[$n_1$, $n_2$, . . . , upper limit]. The mobile device sets the scan delay timer with this selected delay period (step 318 of FIG. 3) and runs the scan delay timer (step 320 of FIG. 3). The mobile device automatically places itself into a power conservation mode during the scanning delay period in order to reduce consumption of the device's battery. The scanning and delaying process continually repeats (each time starting again at step 306 of FIG. 3) until the mobile device connects with one of the wireless networks, if at all, after checking whether a battery test of the mobile device should be performed (step 322 of FIG. 3). As apparent from FIG. 3, each time the mobile device unsuccessfully attempts to connect with any of the networks, the mobile device selects the next scanning delay period from the plurality of scanning delay periods n=[$n_1$, $n_2$, . . . , upper limit] except the upper limit may be used repeatedly once it is reached (see again FIG. 4).

Figure 5:
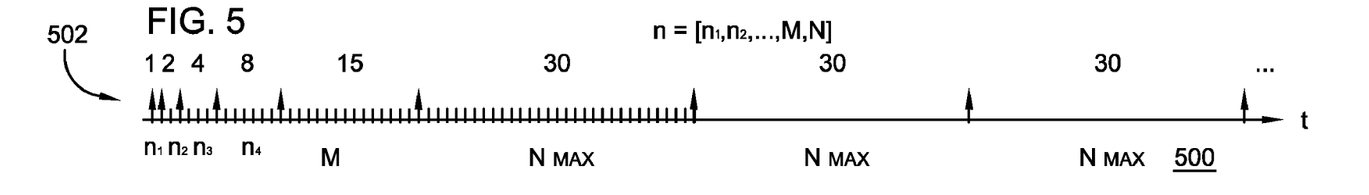

In step 322 of FIG. 3, the mobile device may identify that a battery test should be performed. When the battery test is performed, the mobile device reads the battery capacity of the battery of the mobile device (step 323 of FIG. 3). In general, the mobile device is monitoring to identify whether a predetermined battery condition, such as a low battery capacity condition or a high battery discharge rate, exists (step 324 of FIG. 3). If the predetermined battery condition exists as identified at step 324, then a larger upper limit of N>M is reestablished for the plurality of scanning delay periods n=[$n_1$, $n_2$, . . . , upper limit] (step 326 of FIG. 3). An illustrative example of a second plurality of consecutively-increasing scanning delay periods 502 is shown in a graph 500 of FIG. 5 where n=[1, 2, 4, 8, 15, and 30 seconds] and the upper limit of N is 30 seconds. Again, each upwards-pointing arrow in FIG. 5 is indicative of a scanning operation performed by the mobile device. Here, N=2*M. As shown, assuming no network connection occurs from several network scanning operations, the upper limit of N is preferably used repeatedly once it is reached.

Figure 6:
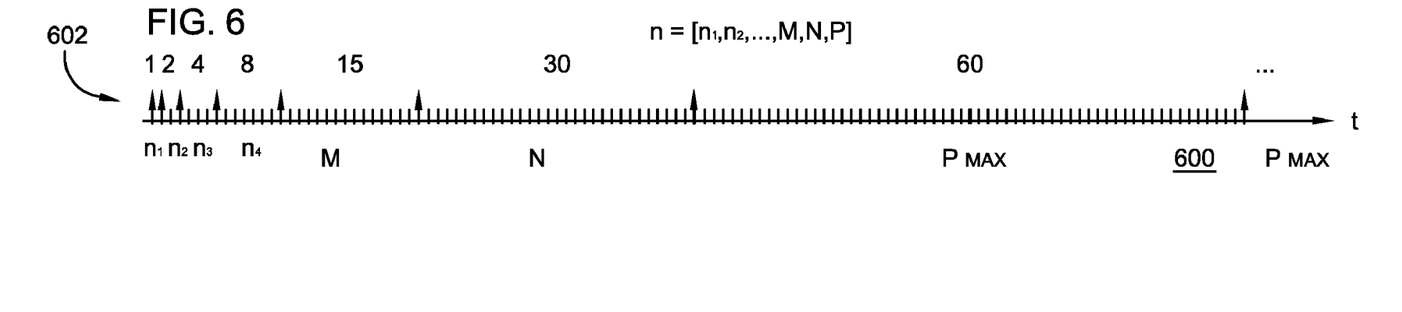

If another predetermined battery condition more severe than the predetermined battery condition is identified from the monitoring (step 328 of FIG. 3), such as an even lower battery capacity condition or an even higher battery discharge rate, then an even larger upper limit of P>N>M may be reestablished for the plurality of scanning delay periods n=[$n_1$, $n_2$, . . . , upper limit] (step 330 of FIG. 3). An illustrative example of a third plurality of consecutively-increasing scanning delay periods 602 is shown in a graph 600 of FIG. 6 where n=[1, 2, 4, 8, 15, 30, and 60 seconds] and the upper limit of P is 60 seconds. Here, P=2*N. As shown, assuming no network connection occurs from several network scanning operations, the upper limit of P is preferably used repeatedly once it is reached.

In an alternative example, the upper limit of M may be 120 seconds where the plurality of scanning delay periods n=[1, 2, 4, 8, 15, 30, 60, and 120 seconds]; the upper limit of N may be 240 seconds where the plurality of scanning delay periods n=[1, 2, 4, 8, 15, 30, 60, 120, and 240 seconds]; and the upper limit of P may be 480 seconds where the plurality of scanning delay periods n=[1, 2, 4, 8, 15, 30, 60, 120, 240, and 480 seconds].

Advantageously, power consumption is reduced further during adverse battery conditions of the mobile device. The reduced power consumption is generally based on the extended time during which the mobile device is kept in the power conservation mode and not performing any scanning operation. The reduced power consumption will prolong the use of the mobile device for the end user in this situation.

Figure 7:
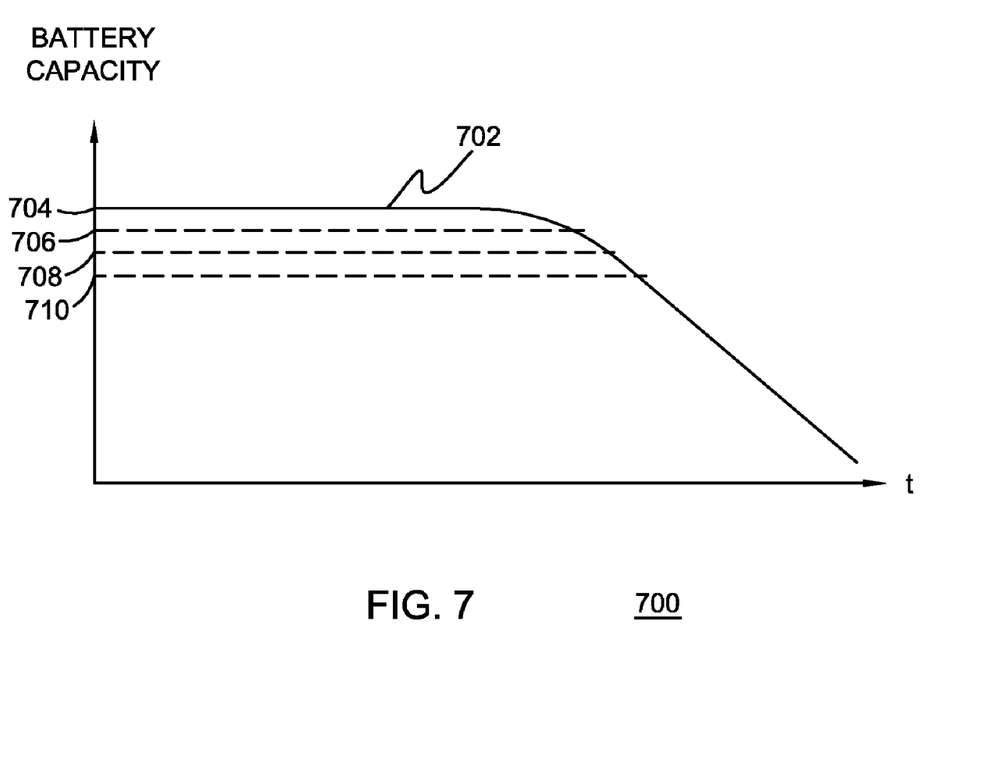
FIG. 7 is a graph of a battery capacity curve of a battery or battery pack of the mobile communication device of the present application.

FIG. 7 is a graph 700 of a battery capacity/time curve 702 of a battery or battery pack of the mobile communication device of the present application. As described above in relation to FIG. 3, the mobile device may change an upper limit of the plurality of scanning delay periods based on a predetermined battery condition. The predetermined battery condition may be a relatively low battery capacity or a relatively high battery discharge rate, as examples. If the battery test is based on the battery capacity, the mobile device may identify the current battery capacity of the battery and compare with a predetermined battery capacity threshold. If the battery capacity is outside a limit set by the predetermined battery capacity threshold, then the predetermined adverse battery capacity is identified. In FIG. 7, a battery capacity between thresholds 704 and 706 may be deemed adequate (e.g. see step 304 of FIG. 3 and FIG. 4), whereas a battery capacity less than a threshold 708 may be deemed to be low (e.g. see steps 324 and 326 of FIG. 3 and FIG. 5). Further, a battery capacity less than a threshold 710 may be deemed to be extremely low (e.g. see steps 328 and 330 of FIG. 3 and FIG. 6).

If the battery test is based on the battery discharge rate, the mobile device may identify the current battery capacity and a previous battery capacity, and identify a battery drainage rate based on these values. In general, the battery drainage rate= [(current battery capacity)−(previous, battery capacity)]/(time period of battery capacity sampling). The battery drainage rate is compared to a predetermined battery drainage threshold. If the battery drainage rate is outside a limit set by the predetermined battery drainage threshold, then the predetermined adverse battery condition is identified. In FIG. 7, a current battery capacity at threshold 706 and a previous battery capacity at threshold 704 sampled between a predetermined time period may be deemed to be a normal discharge rate and therefore adequate (e.g. see step 304 of FIG. 3 and FIG. 4). On the other hand, a current battery capacity at threshold 708 and a previous battery capacity at threshold 704 sampled between the same time period may be deemed to be a high discharge rate (e.g. see steps 324 and 326 of FIG. 3 and FIG. 5). Further, a current battery capacity identified at threshold 710 and a previous battery capacity identified at threshold 704 sampled between the same time period may be deemed to be a very high discharge rate (e.g. see steps 328 and 330 of FIG. 3 and FIG. 6).

As described herein, a scanning operation is performed with use of a wireless transceiver to identify one or more available wireless communication networks in a given coverage area. Each time the scanning operation fails to result in any connection between the mobile device and a wireless network, the scanning operation is repeated after delaying for a next delay period of a plurality of scanning delay periods $n=[n_1, n_2, \ldots, \text{upper limit}]$. Initially, an upper limit of the plurality of scanning delay periods $n=[n_1, n_2, \ldots, \text{upper limit}]$ is established at a value of M. During operation, the mobile device monitors to identify whether a predetermined battery condition, such as a low battery capacity or high battery discharge rate, exists. If the predetermined battery condition exists, the upper limit of the plurality of scanning delay periods $n=[n_1, n_2, \ldots, \text{upper limit}]$ is reestablished at a value of N>M. If a more severe battery condition exists, the upper limit of the plurality of scanning delay periods $n=[n_1, n_2, \ldots, \text{upper limit}]$ is reestablished at a value of P>N>M. Advantageously, power consumption is reduced during adverse battery conditions of the mobile device.

A mobile communication device of the present application includes one or more processors, a wireless transceiver coupled to the one or more processors, and a battery interface which is adapted to receive one or more batteries which supply electrical power to the mobile communication device. The one or more processors are operative to establish an upper limit of a plurality of scanning delay periods $n=[n_1, n_2, \ldots, \text{upper limit}]$ to have a value of M; cause a scanning operation to be performed with use of the wireless transceiver to identify one or more available wireless communication networks in a coverage area of the mobile communication device; and each time the scanning operation fails to result in any connection between the mobile communication device and a wireless communication network, cause the scanning operation to be repeated after delaying for a next delay period of the plurality of scanning delay periods $n=[n_1, n_2, \ldots, \text{upper limit}]$; identify whether a predetermined battery condition of the mobile communication device exists; and reestablish the upper limit of the plurality of delay periods $n=[n_1, n_2, \ldots, \text{upper limit}]$ to have a value of N>M based on identifying the predetermined battery condition of the mobile communication device. If a more severe battery condition exists, the upper limit of the plurality of scanning delay periods $n=[n_1, n_2, \ldots, \text{upper limit}]$ is reestablished at a value of P>N>M. A communication system includes one or more wireless communication networks and at least one mobile communication device which operates as described above.

The above-described embodiments of the present application are intended to be examples only. Those of skill in the art may effect alterations, modifications and variations to the embodiments without departing from the scope of the application.

What is claimed is:

1. A method for use by a communication device in scanning to establish a connection with a wireless communication network for communications, the method comprising the acts of:
    establishing an upper limit of a plurality of consecutively-increasing scanning delay periods n=[n1, n2, . . . , upper limit M] at a value of M;
    causing a scanning operation to be performed to identify one or more available wireless communication networks in a coverage area of the communication device;
    each time the scanning operation fails to result in any connection between the communication device and a wireless communication network, causing the scanning operation to be repeated after delaying for a next scanning delay period of the plurality of consecutively-increasing scanning delay periods;
    identifying a battery drainage rate of the communication device;
    comparing the battery drainage rate with a predetermined battery drainage rate threshold;
    identifying that a predetermined battery condition exists if the battery drainage rate is outside a limit set by the predetermined battery drainage rate threshold; and
    reestablishing the upper limit of the plurality of consecutively-increasing scanning delay periods n=[n1, n2, . . . , upper limit N] at a value of N>M based on identifying the predetermined battery condition of the communication device.

2. The method of claim 1, wherein the predetermined battery drainage rate comprises a first predetermined battery drainage rate, the predetermined battery condition comprises a first predetermined battery condition, and the method further comprises the acts of:
    comparing the battery drainage rate with a second predetermined battery drainage rate threshold;
    identifying that a second predetermined battery condition exists if the battery drainage rate is outside a limit set by the second predetermined battery drainage rate threshold; and
    reestablishing the upper limit of the plurality of scanning delay periods $n=[n_1, n_2, \ldots, \text{upper limit}]$ at a value of P>N>M based on identifying the second predetermined battery condition of the communication device.

3. The method of claim 1, further comprising:
    calculating the battery drainage rate over a time period of operation of the communication device.

4. The method of claim 1, further comprising:
    sampling to obtain a first battery capacity of the communication device;
    at a time period after obtaining the first battery capacity, sampling to obtain a second battery capacity of the communication device; and
    calculating the battery drainage rate based on a difference between the first battery capacity and the second battery capacity.

5. The method of claim 1, further comprising:
    sampling to obtain a first battery capacity of the communication device;

at a time period after obtaining the first battery capacity, sampling to obtain a second battery capacity of the communication device; and calculating the battery drainage rate based on a difference between the first battery capacity and the second battery capacity, divided by the time period of sampling.

6. The method of claim 1, wherein the act of performing a scanning operation comprises the further acts of:
identifying a wireless communication network in a profile;
causing a probe request to be sent for the wireless communication network; and
monitoring to receive a probe response from the wireless communication network.

7. The method of claim 1, wherein the act of performing a scanning operation comprises the further acts of:
causing a probe request to be sent for a wireless communication network; and
monitoring to receive a probe response from the wireless communication network;
if the probe request from the wireless communication network is received: causing a connection to be established with the wireless communication network; and
if the probe response from the wireless communication network is not received: refraining from connecting with the wireless communication network.

8. The method of claim 1, wherein the communication device is operative in accordance with IEEE 802.11 standards.

9. A mobile communication device, comprising:
one or more processors;
a wireless transceiver coupled to the one or more processors;
a battery interface which is adapted to receive one or more batteries which supply electrical power to the mobile communication device;
the one or more processors being operative to:
establish an upper limit of a plurality of consecutively-increasing scanning delay periods n=[n1, n2, . . . , upper limit M] at a value of M;
cause a scanning operation to be performed, with use of the wireless transceiver, to identify one or more available wireless communication networks in a coverage area of the mobile communication device;
each time the scanning operation fails to result in any connection between the mobile communication device and a wireless communication network, cause the scanning operation to be repeated after delaying for a next scanning delay period of the plurality of consecutively-increasing scanning delay periods;
identify a battery drainage rate of the mobile communication device via the battery interface;
compare the battery drainage rate with a predetermined battery drainage rate threshold;
identify that a predetermined battery condition exists if the battery drainage rate is outside a limit set by the predetermined battery drainage rate threshold; and
reestablish the upper limit of the plurality of consecutively-increasing scanning delay periods n=[n1, n2, . . . , upper limit N] at a value of N>M based on identifying the predetermined battery condition.

10. The mobile communication device of claim 9, wherein the predetermined battery drainage rate comprises a first predetermined battery drainage rate, the predetermined battery condition comprises a first predetermined battery condition, and the one or more processors are further operative to:
compare the battery drainage rate with a second predetermined battery drainage rate threshold;
identify that a second predetermined battery condition exists if the battery drainage rate is outside a limit set by the second predetermined battery drainage rate threshold; and
re-establish the upper limit of the plurality of scanning delay periods n =[$n_1$, $n_2$, . . . , upper limit] at a value of P>N>M based on identifying the second predetermined battery condition of the communication device.

11. The mobile communication device of 10, wherein the one or more processors are further operative to:
calculate the battery drainage rate over a time period of operation of the mobile communication device.

12. The mobile communication device of 10, wherein the one or more processors are further operative to identify the battery drainage rate by:
sampling to obtain a first battery capacity;
at a time period after obtaining the first battery capacity, sampling to obtain a second battery capacity; and
calculating the battery drainage rate based on a difference between the first battery capacity and the second battery capacity.

13. The mobile communication device of 10, wherein the one or more processors are further operative to identify the battery drainage rate by:
sampling to obtain a first battery capacity;
at a time period after obtaining the first battery capacity, sampling to obtain a second battery capacity; and
calculating the battery drainage rate based on a difference between the first battery capacity and the second battery capacity, divided by the time period of sampling.

14. The mobile communication device of 10, wherein the one or more processors are further operative to:
identify a wireless communication network in a profile;
cause a probe request to be sent, via the wireless transceiver, for the wireless communication network; and
monitor, with use of the wireless transceiver, to receive a probe response from the wireless communication network.

15. The mobile communication device of claim 9, which is operative in accordance with IEEE 802.11 standards.

16. A communication system, comprising:
one or more wireless communication networks;
at least one mobile communication device;
the at least one mobile communication device having:
one or more processors;
a wireless transceiver coupled to the one or more processors;
a battery interface which is adapted to receive one or more batteries which supply electrical power to the mobile communication device;
the one or more processors being operative to:
establish an upper limit of a plurality of consecutively-increasing scanning delay periods n=[n1, n2, . . . , upper limit M] at a value of M;
cause a scanning operation to be performed, with use of the wireless transceiver, to identify the one or more available wireless communication networks in a coverage area of the mobile communication device;
each time the scanning operation fails to result in any connection between the mobile communication device and a wireless communication network, cause the scanning operation to be repeated after delaying for a next scanning delay period of the plurality of consecutively-increasing scanning delay periods;

identify a battery drainage rate of the mobile communication device via the battery interface;

compare the battery drainage rate with a predetermined battery drainage rate threshold;

identify that a predetermined battery condition exists if the battery drainage rate is outside a limit set by the predetermined battery drainage rate threshold; and reestablish the upper limit of the plurality of consecutively-increasing scanning delay periods n=[n1, n2, . . . , upper limit N] at a value of N>M based on identifying the predetermined battery condition.

17. The communication system of claim 16, wherein the predetermined battery drainage rate comprises a first predetermined battery drainage rate, the predetermined battery condition comprises a first predetermined battery condition, and the one or more processors are further operative to:

compare the battery drainage rate with a second predetermined battery drainage rate threshold;

identify that a second predetermined battery condition exists if the battery drainage rate is outside a limit set by the second predetermined battery drainage rate threshold; and re-establish the upper limit of the plurality of scanning delay periods n =[$n_1$, $n_2$, . . . , upper limit] at a value of P>N>M based on identifying the second predetermined battery condition of the communication device.

18. The communication system of claim 16, wherein the one or more processors are further operative to:

calculate the battery drainage rate over a time period of operation of the mobile communication device.

19. The communication system of claim 16, wherein the one or more processors are further operative to identify the battery drainage rate by:

sampling to obtain a first battery capacity;

at a time period after obtaining the first battery capacity, sampling to obtain a second battery capacity; and calculating the battery drainage rate based on a difference between the first battery capacity and the second battery capacity.

20. The communication system of claim 16, wherein each of the one or more communication networks are wireless local area networks (WLANs) operative in accordance with IEEE 802.11 standards, and the mobile communication device is operative in accordance with IEEE 802.11 standards.

* * * * *